(12) United States Patent
Messina

(10) Patent No.: US 6,934,591 B2
(45) Date of Patent: Aug. 23, 2005

(54) FIGURE EIGHT HYSTERESIS CONTROL METHOD AND FOLLOW-UP SYSTEM

(75) Inventor: Peter V. Messina, Santa Monica, CA (US)

(73) Assignee: Raytheon Company, Waltham, MA (US)

(*) Notice: Subject to any disclaimer, the term of this patent is extended or adjusted under 35 U.S.C. 154(b) by 512 days.

(21) Appl. No.: 10/152,662

(22) Filed: May 20, 2002

(65) Prior Publication Data

US 2003/0216820 A1 Nov. 20, 2003

(51) Int. Cl.$^7$ .............................................. G05B 19/18
(52) U.S. Cl. ............................ 700/56; 700/58; 700/59; 700/64; 348/352; 348/169; 348/234; 348/208.99; 219/121.78; 219/121.74
(58) Field of Search .............................. 700/56, 58, 59, 700/64; 348/352, 169, 234, 208.99; 219/121.78, 121.74

(56) References Cited

U.S. PATENT DOCUMENTS

| | | | |
|---|---|---|---|
| 2,750,844 A | | 6/1956 | Davis |
| 5,155,327 A | * | 10/1992 | Hoag .................... 219/121.78 |
| 5,654,549 A | * | 8/1997 | Landecker et al. ......... 250/332 |
| 6,158,694 A | * | 12/2000 | Gowrinathan ............... 244/171 |
| 6,388,606 B1 | * | 5/2002 | Keydel et al. ............ 342/25 R |

FOREIGN PATENT DOCUMENTS

| | | |
|---|---|---|
| FR | 2 555 012 A | 5/1985 |
| GB | 706 494 A | 3/1954 |

* cited by examiner

*Primary Examiner*—Anthony Knight
*Assistant Examiner*—Thomas Pham
(74) *Attorney, Agent, or Firm*—John E. Gunther; Leonard A. Alkov; Karl A. Vick

(57) ABSTRACT

A control system (102) operates within a dynamic range, and a follow-up system (104) is commanded to reduce a positional error between the follow-up system and the control system when the dynamic range is exceeded. A linear follow-up command may be initially provided once a dead band value (208) is exceeded. The follow-up system (104) is driven relative to its base mount (103) in a direction to reduce the positional error to within a null value range (214). The follow-up command may also implement a decay function to control the follow-up system (104). A control variable transfer function may also be utilized to gradually subtract the dead band value from the follow-up system position error command as a function of time. The decaying function may include linear as well as non-linear decaying functions. In one embodiment, a figure eight-type hysteresis control function may be implemented to control the inertial position of an inertial element. The various embodiments of the present invention may be suitable for space-based laser designating and targeting systems, space-based camera-positioning systems, space-based telescopes, and radar antenna positioning systems.

24 Claims, 3 Drawing Sheets

FIGURE EIGHT HYSTERESIS CONTROL METHOD AND FOLLOW-UP SYSTEM

US GOVERNMENT RIGHTS

This invention was made with Government support under Contract N00019-97-C-0009 awarded by the Department of the Navy. The U.S. Government has certain rights in this invention.

TECHNICAL FIELD

The present invention pertains to follow-up control systems, and in one embodiment, to positional control of a controlling system, and in another embodiment, to electro-optical systems that utilize gimbals.

BACKGROUND

Conventional follow-up systems respond to position errors of a control system in a linear manner such that the control command is proportional to the position error. In some conventional follow-up systems, the control system continually commands the follow-up system to respond to even small positional errors that are well within the dynamic range of the control system. In other conventional follow-up systems, the follow-up system may allow the control system to operate within a dynamic range, however large initial step commands are provided to the follow-up system when the dynamic range is exceeded. Large step commands are undesirable, especially in sensitive electro-optical and mechanical systems. For example, tactical airborne systems may utilize an inner yaw gimbal and one or more outer roll gimbals for laser designation, targeting or positioning. The inner gimbal may be a fine gimbal and may be part of a control system and the outer gimbal may be a coarse gimbal and may be part of the follow-up system. In operation, the outer gimbal may have to continually roll to keep the yaw of the inner gimbal zeroed.

Thus there is a general need for a follow-up system and control method that allow a control system to operate within a dynamic range. There is also a general need for a system and control method that does not command a follow-up system with large step functions. There is also a need for an improved laser designating and/or targeting system suitable for use in tactical airborne systems.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In one embodiment, a control system operates within a dynamic range, and a follow-up system is commanded to reduce a positional error between the follow-up system and the control system when the dynamic range is exceeded. A linear follow-up command may be initially provided once a dead band value is exceeded. The follow-up system may be driven relative to its base mount in a direction to reduce the positional error to within a null value range. A decay function may also be implemented to control the follow-up system. A control variable transfer function may also be utilized to gradually subtract the dead band value from the follow-up system position error command as a function of time. The decaying function may include linear as well as non-linear decaying functions. In one embodiment, a figure eight-type hysteresis control function may be implemented to control the inertial position of an inertial element.

The control and follow-up systems of the present invention may be used as part of a laser designating system or targeting system on a tactical airborne platform. The control and follow-up systems of the present invention may also be used for positioning in space-based optical telescope and optical camera applications. Optical may include visible as well as infrared and ultraviolet light.

Figure 1:
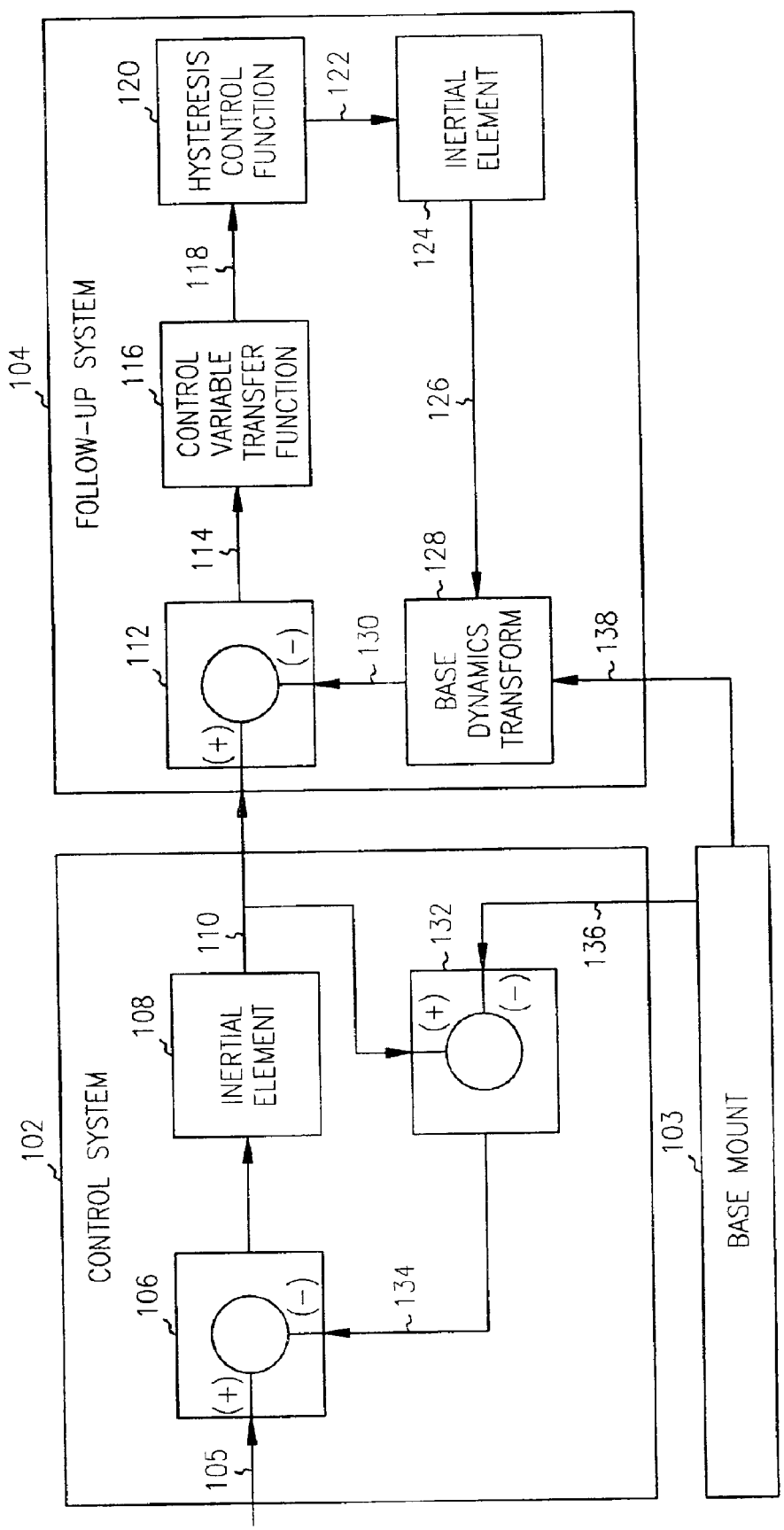
FIG. 1 is a functional block diagram illustrating a control system and follow-up system in accordance with an embodiment of the present invention.

FIG. 1 is a functional block diagram illustrating a control system and follow-up system in accordance with an embodiment of the present invention. Control system 102 and follow-up system 104 may be part of an electro-mechanical system or an electro-optical system, and in one embodiment, portions thereof may be located on one or more gimbals. Control system 102 and follow-up system 104 may have a common axis of rotation, while in other embodiments, they may have orthogonal axes of rotation. In general, follow-up system 104 is responsive to a relative position between control system 102 and follow-up system 104. Follow-up system 104 responds to reduce this relative position in a manner described herein. In one embodiment, the motion of follow-up system 104 is commanded by a position error signal. In this embodiment, follow-up system 104 allows control system 102 to move within a predetermined dynamic range before follow-up system 104 may be commanded to move to reduce the positional error between the systems. In one embodiment, follow-up system 104 may be commanded to substantially re-center control system 102 at or near a center of the control system's dynamic range.

In one embodiment, a figure eight-hysteresis control function may be implemented which may create a dead-band in the control function for follow-up system 104. In this embodiment, once a dead band value for the relative positional error is exceeded, follow-up control system may be gradually commanded to reduce the relative positional error to zero or to within a null-value range. A decaying function may be implemented to control follow-up system 104 to reduce the relative positional error.

Control system 102 receives control system reference frame position command signal 105, which is used to control inertial element 108. Inertial element 108 may include one or more gimbals, and in one embodiment, inertial element 108 may be an inner yaw gimbal of an electro-optical system. For example, control system 102 and follow-up system 104 together may be part of a laser designating system or targeting system on a tactical airborne platform. In this embodiment, inertia of control system 102 may be driven relative to inertia of base mount 103.

Inertial element 108 generates control system position signal 110 which may represent an inertial position of system 102. Control system position signal 110 may be combined with reference frame inertial position signal 136 by reference frame position sensor 132 to generate control system reference frame position signal 134. Reference frame position signal 134 may be combined with reference frame position command signal 105 in element 106 for control of inertial element 108.

Reference frame inertial position signal 136 may represent a reference frame, which may have been defined for control system 102. For example, when control system 102 is located on base mount 103, reference frame inertial position signal 136 may represent the inertial position of the base when the control system is pointing relative to base mount 103. Reference frame position sensor 132 may measure a difference between the inertial position of control system 102 and the inertial position of base mount 103 to generate reference frame position signal 134. Control system 102 and follow-up system 104 may use a resolver or position potentiometer. Control system reference frame position command signal 105 may be generated to command control system 102 based on the desired difference. Control system reference frame position command signal 105 may be generated, for example, by an operator or an automatic position generator (not illustrated).

For example, if control system 102 is pointing relative to an inertial coordinated frame (e.g., North, East, Down coordinates), reference frame position sensor 132 may measure a difference between the control system's inertial position in these coordinates and the inertial position of base mount 103. Reference frame position sensor 132 may generate a complex navigation equation solution using inertial angle sensors, such as gyros. Control system reference frame position command signal 105 may command the desired difference in these coordinates, which may be computed by a mission computer, which computes the desired coordinates. In one embodiment, if control system 102 is pointing relative to an arbitrary inertial coordinated frame, for example, when-tracking an image in space, reference frame position sensor 132 may measure the difference between the image and the center of a display or line of sight. In this embodiment, sensor 132 may operate as part of an image tracker. Control system reference frame command signal 105 may be the desired difference between where the image is relative to the line of sight generated by an image tracking function.

Follow-up system 104 may include, among other things, relative position sensor 112, control variable transfer function element 116, hysteresis control function element 120, inertial element 124 and base dynamics transform element 128. Relative position sensor 112 may generate relative position signal 114 by combining position signal 110 with inertial positional signal 130. Follow-up system positional signal 126 may represent an inertial position of system 104. In one embodiment, relative position signal 114 may be a control function, which may be driven to zero or within a null value range when the control function exceeds a dead-band value. In one embodiment, position sensor 112 may measure the relative angular position or relative linear distance between inertias of systems 102 and 104.

Control variable transfer function element 116 may generate control signal 118 from relative position signal 114.

Control variable transfer function element 116 may implement a transfer function to generate a control variable for use by control function element 120. Control function element 120 generates command signal 122 to control follow-up system inertial element 124. In one embodiment, control function element 120 may implement a figure eight hysteresis control function to control the motion of inertial element 124. Inertial element 124 provides follow-up system position signal 126 to base dynamics transform element 128, which may transform follow-up system position signal 126 to inertial position signal 130 for use by relative position sensor 112, for example, by using base dynamics signal 138. Control function element 120 may be part of a system controller whose functions are implemented by one or more software configured processor.

The various functional elements of control system 102 and follow-up system 104 are illustrated in FIG. 1 as separate functional elements for ease of understanding the embodiments of the present invention and may be comprised of both hardware elements and software elements, including combinations thereof. Furthermore, in some cases, their functions may be performed by software-configured processors. In addition, some of these functional elements may be combined with others.

Figure 2:
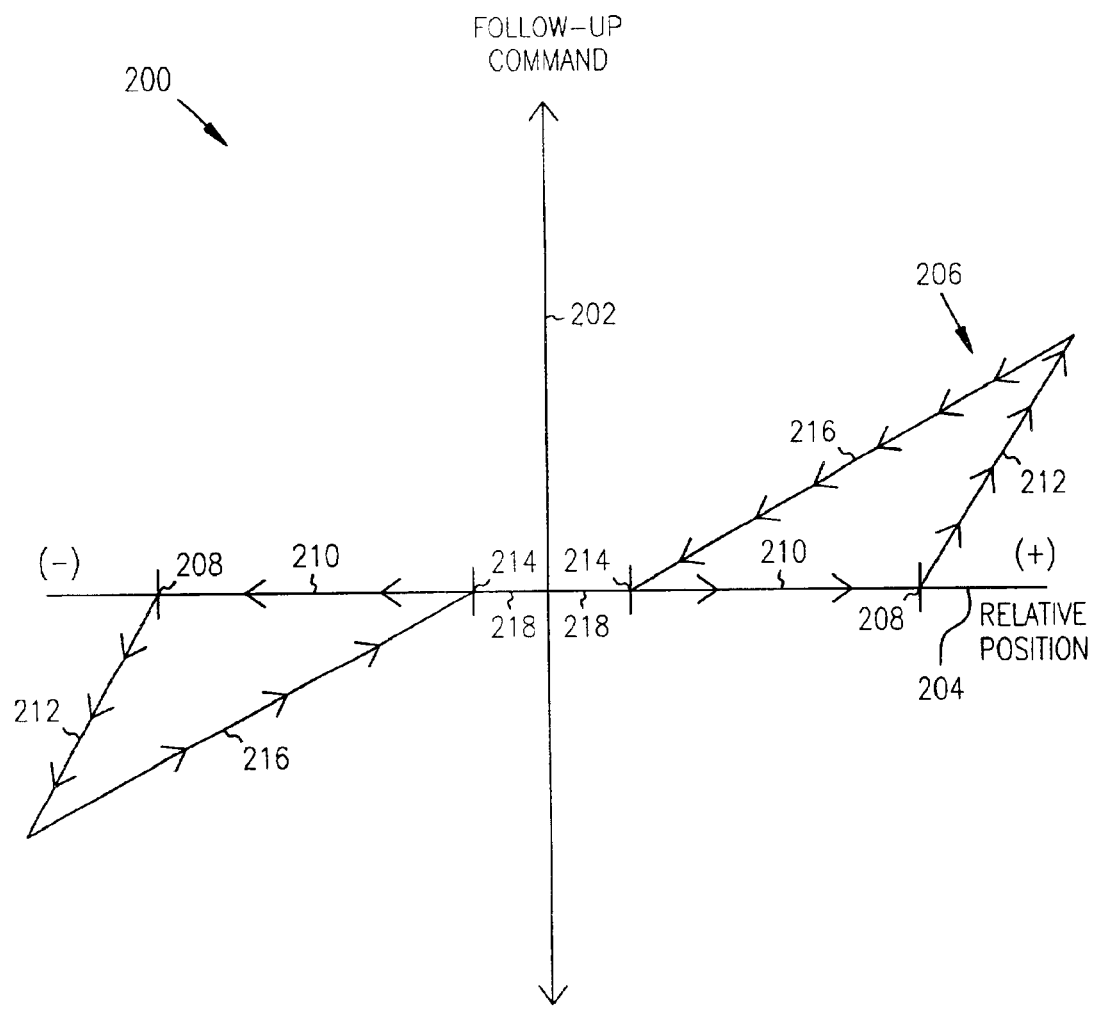
FIG. 2 is a diagram illustrating the operation of a follow-up system in accordance with an embodiment of the present invention.

FIG. 2 is a diagram illustrating the operation of a follow-up system in accordance with an embodiment of the present invention. X-axis 204 of illustration 200 may represent a relative position error between a follow-up system, such as follow-up system 104 (FIG. 1), and a control system, such as control system 102 (FIG. 1). Y-axis 202 of illustration 200 may represent a value of follow-up command 206 which may be provided to the follow-up system. The relative position along X-axis 204 may represent at least a portion of the information conveyed by relative position sensor 112 (FIG. 1) in relative position signal 114 (FIG. 1). Follow-up command 206 may represent information conveyed by command signal 122 (FIG. 1) which may be provided to inertial element 124 (FIG. 1).

In one embodiment, follow-up command 206 may be a direct function of the relative position along X-axis 204 (e.g., the control variable). Follow-up command 206 may be generated by hysteresis control function element 120 (FIG. 1). In this embodiment, a gating function may be utilized which may be initially set to zero. Follow-up command 206 may be set to zero when the absolute value of the control variable is less than or equal to dead-band value 208 and the gating function is zero. This is illustrated by portion 210 of follow-up command 206 and allows the control system to move within the dead-band without commanding the follow-up system to move.

When the gating function is zero and the absolute value of the control variable exceeds dead-band value 208, follow-up command 206 may be a direct function of the control variable. In one embodiment, when the absolute value of the control variable exceeds dead-band value 208, follow-up command 206 may be a linear function of the control variable to establish a smooth transition for control of the follow-up system. Initially, follow-up command 206 may be approximately zero when the absolute value of the control variable initially exceeds dead-band value 208. This linear function is illustrated by portion 212 of follow-up command 206. In one embodiment, portion 212 of follow-up command 206 may be approximately equal to the control variable minus the sign of the control variable multiplied by the value of the control variable when the dead-band value is exceeded. The value of the control variable when the dead-band value is exceeded may be equal to the dead-band value. This may be described by the following equation:

$$\phi=\psi-\text{sign}(\psi)*\psi_1$$

In this equation, φ may be the follow-up command, ψ may be the control variable and $\psi_1$ may be the value of the control variable when the dead-band value is exceeded. In one embodiment, hysteresis control function element 120 (FIG. 1) may provide the follow-up command to follow-up system inertial element 124 placing the follow-up system in motion in a direction to reduce the position error represented by relative position signal 114 (FIG. 1). For example, when the follow-up system includes a roll gimbal and the control system includes a yaw gimbal, the follow-up command may cause servomotors to roll the follow-up system to reduce the yaw of the control system. The gating function may be set to one while the follow-up command φ is non-zero and the follow-up system is in motion.

When the gating function is one, and the absolute value of the control variable is greater than null value 214, the follow-up command may implement a decay function, which is illustrated by portions 212 and 216 of follow-up command 206. In one embodiment, follow-up command 206 may be equal to the control variable minus the sign of the control variable multiplied by a decay function θ. This may be described by the following equation:

$$\phi=\psi-\text{sign}(\psi)*\theta$$

The decay function θ may be represented by the following equation:

$$\theta=DB(1-C/N)$$

where DB may be dead-band value 208, and C may be a counter that is incremented from one to N, where N is a number of clock counts. The number of clock counts may be determined from system dynamics. When the number of clock counts is fixed, the decay time is also fixed and may be independent of $\psi_1$. Accordingly, when the follow-up system is still in motion nulling the command variable, the follow-up command may also be reduced by a decaying function.

Once the absolute value of the control variable becomes less than null value 214 and the gating function is one, the follow-up command φ may be set to zero and the gating function may be reset (e.g., to zero). This is illustrated by portion 218 of follow-up command 206. Accordingly, once the follow-up command variable becomes less than null-value 214, the control system may be substantially centered within its dynamic range. The command to the follow-up system may be set to zero allowing the control system to again operate within a dynamic range between dead-band values 208. In one embodiment, null value 214 may be approximately zero, or within a few degrees of zero, allowing the control system to be substantially centered in its dynamic range.

In an embodiment where the follow-up system includes a roll gimbal and the control system includes a yaw gimbal, the yaw gimbal may have a dynamic range of about four degrees and dead band value 208 may be set to approximately four degrees, however dead band values of as small as one or two degrees and as great as 100 degrees or more are also suitable. The roll gimbal may have a dynamic range of up to 360 degrees, although this is not a requirement. In another embodiment, the dead-band value may be between approximately twenty and eighty milliradians and the null value may be between approximately one-half and five milliradians.

In another embodiment, follow-up command 206 may be an indirect function of relative position 204 (e.g., the control variable). In this embodiment, a control variable transfer function may be utilized. The control variable transfer function β may be a function of the control variable and may be generated by control variable transfer function element 116 (FIG. 1). In this embodiment, once dead band value 208 is exceeded, the follow-up system may be driven (i.e., relative to base mount 103 (FIG. 1)) in a direction to reduce the position error command via the control variable transfer function, which may drive the control function to within a null-value range. This may be accomplished by subtracting an amount, such as the control function, at a dead band value β(0), from the follow-up system position error command as a function of time (e.g., a decay function), so that the control function is driven toward zero rather than dead band value 208. The decay function may be almost any decaying function including both linear and non-linear functions and combinations thereof. Examples of suitable non-linear decaying functions include exponential functions, powered functions, piecewise linear or non-linear functions and discrete functions. In this embodiment, the follow-up command may be represented by the following equation:

$$\phi=\beta-\text{sign}(\beta_1)*\theta$$

The decay function θ may initially be an initial value such as $\beta_1$ and may decay to zero at a final time count. $\beta_1$ may be the value of the control variable when the control function reaches dead band 208 which may be at the initial count so that φ begins at zero. The decay function θ may be a function of the initial command variable $\beta_1$ and may be represented by the following equation:

$$\theta=\beta_1(1-C/N)$$

Thus, the decay function θ may equal the initial command value $\beta_1$ when the control value exceeds dead band value 208. When the number of clock counts N is fixed, the decay time is thus fixed and independent of the initial value $\beta_1$ of the control variable. To make the decay time constant and independent of the potentially varying magnitude of the initial value $\beta_1$, the value of N maybe calculated using the dead band value as the initial value such that $N=\beta_1/(R*T)$. R may represent a rate of decay (e.g., in radians per second) and T is time.

Initially, before the counter is started, C may equal zero and follow-up command 206 may be a direct function of the control variable represented by portion 212 of control follow-up command 206. Once the counter is started (e.g., C may begin at one), the follow-up command may implement a decaying function represented by portions 212 and 216 of follow-up command 206.

Although portions 212 and 216 of follow-up command 206 are illustrated in FIG. 2 as straight lines, this is not a requirement, as portions 212 and 216 of follow-up command 206 may include both linear and/or non-linear functions. Follow-up command 206 may provide a smooth transition when the control variable exceeds dead band value 208 and may gradually command the follow-up system to null the control variable to within null value 214. The arrows along follow-up command 206 may illustrate the direction that follow-up command 206 follows once dead band value 208 is exceeded.

Figure 3:
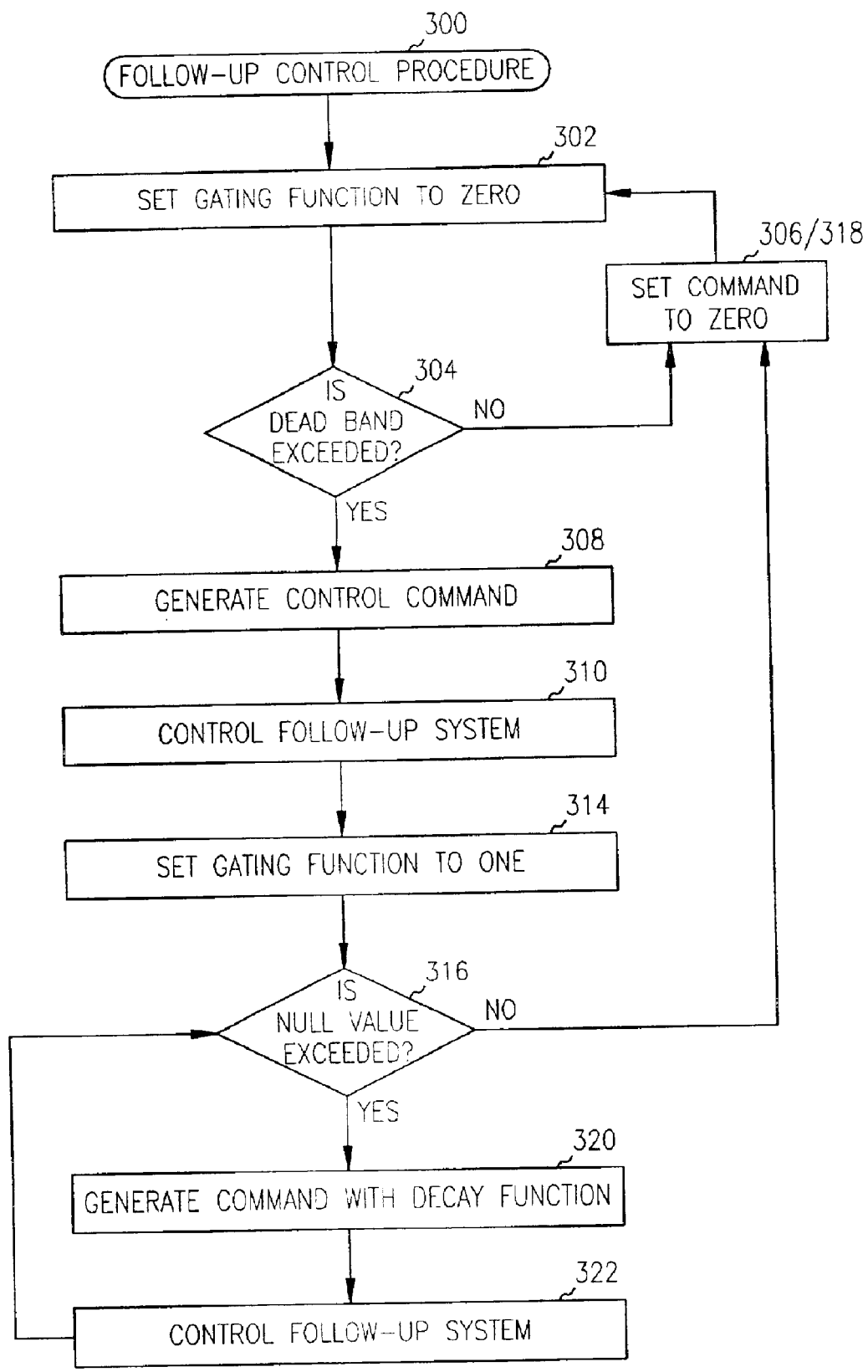
FIG. 3 is a flow chart of a follow-up control procedure in accordance with an embodiment of the present invention.

FIG. 3 is a flow chart of a follow-up control procedure in accordance with an embodiment of the present invention. Procedure 300 may be utilized to control a follow-up system in response to positional error signals from a control system. For example, procedure 300 may be performed by hysteresis control function element 120 (FIG. 1) of follow-up system 104 (FIG. 1) in response to relative position signal 114 (FIG. 1), although other systems and system elements are also suitable for performing procedure 300. Although the individual operations of procedure 300 are illustrated and described as separate operations, one or more of the individual operations may be performed concurrently and nothing requires that the operations be performed in the order illustrated. In general, procedure 300 controls a follow-up system to move in a direction to drive a positional error to within a null value range once the positional error exceeds a dead band value. In one embodiment, a control variable transfer function may be utilized to gradually reduce the follow-up system position error command. In this embodiment, the control variable transfer function may be generated by control variable transfer function element 116 (FIG. 1).

In several embodiments, a figure eight-type hysteresis control function may be implemented to control the inertial position of an inertial element. In these embodiments, procedure 300 may be suitable for use in a laser designating and targeting system, a fine laser-positioning system, a camera-positioning system, and/or a telescope positioning system. These systems may be suitable for use on a spacecraft or airborne platform. Procedure 300 may also be suitable for use as part of a radar antenna positioning system.

In operation 302, a gating function may be set to zero. This allows the control system to operate within a dynamic range, which may be determined by the dead band value, such as dead band value 208 (FIG. 2). Until the dead band value is exceeded in operation 304, no command is provided to the follow-up system in operation 306 while the gating function is zero. When the dead band value is initially exceeded, operation 308 may be performed. In operation 308, a linear control command function may be generated and the follow-up system is controlled with the linear command in operation 310 which may place the follow-up system in motion. The linear command may control the follow-up system in accordance with portion 212 (FIG. 2) of follow-up command 206 (FIG. 2). While the follow-up system is in motion, the gating function may be set to one in operation 314.

When a null value is exceeded in operation 316, a follow-up command that implements a decay function may be generated in operation 320 and used to control the follow-up system in operation 322. Operation 322 may control the follow-up system in accordance with portion 216 (FIG. 2) of follow-up command 206 (FIG. 2). Examples of control functions that implement decaying functions suitable for use in operations 320 and 322 are described in the description above for FIG. 2. Operation 322 controls the follow-up system until the relative position between the control and follow-up system no longer exceeds the null value, which may be checked in operation 316. When the null value is no longer exceeded, operation 318 sets the follow-up command to zero allowing the control system to operate within a dynamic range determined by the dead band values, and the operations of procedure 300 may be repeated.

In embodiments that use a counter to implement a decaying function, operations 304 through 310 may be performed before the counter begins to count (e.g., C=0), and operations 316 through 322 may be performed when a counter is incremented from one to a final count value N.

In one embodiment, when the dead band value is initially exceeded in operation 304, operations 316 through 322 may be performed and operations 308 through 314 may be skipped. In this embodiment, when the dead band value is initially exceeded, a follow-up command with a decay function is implemented and used to control the follow-up system. The counter may initially be zero the first time through the loop. In this embodiment, a control variable transfer function may also be utilized which may be a function of the control variable and may be generated by control variable transfer function element 116 (FIG. 1). In this embodiment, once dead band value 208 is exceeded, the follow-up system may be driven (i.e., relative to its base mount) in a direction to drive the follow-up system position error command to approximately zero via the control variable transfer function which drives the control function to within a null-value range.

In one embodiment, the present invention provides a set of programming instructions that may be executed by a digital processing device. In this embodiment, an article comprising a computer readable storage medium, such as a disc or memory, may have programming stored thereon instructions, that when executed by a computing platform, result in providing a first position control command to a follow-up system when a relative position between a follow-up system and the controlling system initially exceeds a dead-band value, and providing a second position control command to the follow-up system while the relative position exceeds a null value, the null value being less than the dead-band value. The follow-up system may be responsive to the first and second position control commands. The first position control command places the follow-up system in motion to reduce the relative position and the second position control command further reduces the relative position. The second position control command may be provided after the first position control command and while the follow-up system is still in motion. The first position control command may implement a direct or substantially linear, and-the second position control command may implement a decaying function.

Thus, an improved follow-up system and control method have been described. In one embodiment, a control system may operate within a dynamic range and may gradually command a follow-up system to reduce a positional error between the follow-up system and the control system when the dynamic range is exceeded. In one embodiment, a linear follow-up command is initially provided once a dead band value is exceeded. In another embodiment, a follow-up command implementing a decay function commands the follow-up system. In another embodiment, a control variable transfer function is utilized. In addition to allowing a control system to operation within a dynamic range, embodiments of the present invention do not require commanding a follow-up system with large step functions as conventional systems do. An improved laser designating and targeting system suitable for use in tactical airborne systems has also been described. In yet another embodiment, an improved fine laser-positioning device suitable for use on spacecraft is provided. In yet another embodiment, camera-positioning system suitable for use on spacecraft is provided. In yet another embodiment, a telescope positioning system suitable for use on a spacecraft is provided. In yet another embodiment, a radar antenna positioning system is provided.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for controlling a follow-up system comprising:
providing a first position control command to the follow-up system when a relative position between the follow-up system and a controlling system initially exceeds a dead-band value; and
providing a second position control command to the follow-up system while the relative position exceeds a null value, the null value being less than the dead-band values,
wherein the first position control command implements a substantially linear function increasing from a zero initial value in relation to an amount the dead-band value is exceeded to provide a smooth transition for controlling the follow-up system, the first position control command allowing an increase in the relative position beyond the dead-band value.

2. The method of claim 1 wherein the follow-up system is responsive to the first and second position control commands, the first position control command placing the follow-up system in motion, the second position control command to reduce the relative position, and
wherein the second position control command is initially provided at approximately a current value of the first position control command.

3. The method of claim 1 further comprising:
refraining from providing the first position control command to the follow-up system until the dead-band value is initially exceeded; and
refraining from providing the second position control command to the follow-up system once the relative position no longer exceeds the null value.

4. The method of claim 1 wherein the follow-up system is part of a outer gimbal and the controlling system is part of an inner gimbal located within the outer gimbal, the inner and outer gimbals having either a common or orthogonal axis of rotation, and wherein the relative position is a relative inertial position.

5. The method of claim 2 wherein the second position control command is provided after the first position control command and while the follow-up system is still in motion.

6. The method of claim 1 wherein the substantially linear function implemented by the first position control command is approximately linearly proportional to the amount the dead-band value is exceeded, and
wherein the second position control command implements a decaying function being initially provided at approximately a current value of the first position control command.

7. A method for controlling a follow-up system comprising:
providing a first position control command to the follow-up system when a relative position between the follow-up system and a controlling system initially exceeds a dead-band value; and
providing a second position control command to the follow-up system while the relative position exceeds a null value, the null value being less than the dead-band value,
wherein the first position control command implements a substantially linear function, and the second position control command implements a decaying function, and
wherein the decaying function includes at least one of an exponential decaying function, a powered decaying function, a piecewise linear decaying function, a non-linear decaying function, a discrete decaying function or a linear decaying function.

8. A method for controlling a follow-up system comprising:
providing a first position control command to the follow-up system when a relative position between the follow-up system and a controlling system initially exceeds a dead-band value;
providing a second position control command to the follow-up system while the relative position exceeds a null value, the null value being less than the dead-band value;
refraining from providing the first position control command to the follow-up system until the dead-band value is initially exceeded;
refraining from providing the second position control command to the follow-up system once the relative position no longer exceeds the null value; and
providing a third position control command to the follow-up system once the relative position no longer exceeds the null value, the third position control command instructing the follow-up system to refrain from motion.

9. A follow-up system comprising:
a relative position sensor to determine a relative position between the follow-up system and a controlling system; and
a controller to generate a first position control command when the relative position initially exceeds a dead-band value, and to generate a second position control command while the relative position exceeds a null value, the null value being less than the dead-band value,
wherein the first position control command implements a substantially linear function increasing from a zero initial value in relation to an amount the dead-band value is exceeded to provide a smooth transition for controlling the follow-up system, the first position control command allowing an increase in the relative position beyond the dead-band value.

10. The follow-up system of claim 9 further comprising electro-mechanical elements responsive to the first position control command to place the follow-up system in motion, and responsive to the second position control command to move the follow-up system to reduce the relative position.

11. The follow-up system of claim 10 wherein the second position control command is provided by the controller after the first position control command and while the follow-up system is in motion caused by the first position control command, and
wherein the first position control command causes the electro-mechanical elements to implement the substantially linear function, and the second position control command causes the electro-mechanical elements to implement a decaying function,
wherein the substantially linear function is approximately linearly proportional to the amount the dead-band value is exceeded, and
wherein the decaying function is initially provided at approximately a current value of the first position control command.

12. The follow-up system of claim 11 wherein the follow-up system is part of an outer gimbal and the controlling system is part of an inner gimbal located within the outer gimbal, the inner and outer gimbals having either a common or orthogonal axis of rotation, and wherein the relative position is a relative inertial position.

13. The follow-up system of claim 11 wherein the controlling system includes a fine laser-positioning device.

14. The follow-up system of claim 11 wherein the follow-up system is part of a camera positioning system for use on a spacecraft.

15. The follow-up system of claim 11 wherein the follow-up system is part of a telescope positioning system for use on a spacecraft.

16. The follow-up system of claim 11 wherein the follow-up system is part of a radar antenna positioning system.

17. The follow-up system of claim 12 wherein the first and second position control command instructs the outer gimbal to roll to null yaw of the inner gimbal.

18. A method of controlling an optical sensing device located on a controlling system comprising:
providing a first position control command to a follow-up system when a relative position between the follow-up system and the controlling system initially exceeds a dead-band value; and
providing a second position control command to the follow-up system while the relative position exceeds a null value, the null value being less than the dead-band value,
wherein the first position control command implements a substantially linear function increasing from a zero initial value in relation to an amount the dead-band value is exceeded to provide a smooth transition for controlling the follow-up system, the first position control command allowing an increase in the relative position beyond the dead-band value.

19. The method of claim 18 wherein the follow-up system is responsive to the first and second position control commands, the first position control command placing the follow-up system in motion, the second position control command to reduce the relative position,
wherein the second position control command is provided after the first position control command and while the follow-up system is still in motion, and
wherein the substantially linear function implemented by the first position control command is approximately linearly proportional to the amount the dead-band value is exceeded, and
wherein the second position control command implements a decaying function that is initially provided at approximately a current value of the first position control command.

20. A method of controlling an optical sensing device located on a controlling system comprising:
providing a first position control command to a follow-up system when a relative position between the follow-up system and the controlling system initially exceeds a dead-band value; and
providing a second position control command to the follow-up system while the relative position exceeds a null value, the null value being less than the dead-band value,
wherein the follow-up system is responsive to the first and second position control commands, the first position control command placing the follow-up system in motion, the second position control command to reduce the relative position,
wherein the second position control command is provided after the first position control command and while the follow-up system is still in motion, wherein the first position control command implements a substantially linear function, and the second position control command implements a decaying function, and
wherein the method further comprises:
refraining from providing the first position control command to the follow-up system until the dead-band value is initially exceeded;
refraining from providing the second position control command to the follow-up system once the relative position no longer exceeds the null value;
providing a third position control command to the follow-up system once the relative position no longer exceeds the null value, the third position control command instructing the follow-up system to refrain from motion; and
providing the third position control command to the follow-up system until the controlling system subsequently exceeds the dead-band value.

21. A laser designating system comprising:
a relative position sensor to determine a relative position between a follow-up system and a controlling system;
a controller to generate a first position control command when the relative position initially exceeds a dead-band value, and to generate a second position control command while the relative position exceeds a null value, the null value being less than the dead-band value; and
electro-mechanical elements responsive to the first position control commands to place the follow-up system in motion to reduce the relative position, and responsive to the second position control command to move the follow-up system to further reduce the relative position,
wherein the first position control command implements a substantially linear function increasing from a zero initial value in relation to an amount the dead-band value is exceeded to provide a smooth transition for controlling the follow-up system, the first position control command allowing an increase in the relative position beyond the dead-band value.

22. The system of claim 21 wherein the second position control command is provided by the controller after the first position control command and while the follow-up system is in motion, and wherein the first position control command causes the electro-mechanical elements to implement the substantially linear function, and the second position control command causes the electro-mechanical elements to implement a decaying function,
wherein the substantially linear function is approximately linearly proportional to the amount the dead-band value is exceeded, and
wherein the decaying function is initially provided at approximately a current value of the first position control command.

23. The system of claim 22 wherein the follow-up system is part of an outer gimbal and the controlling system is part of an inner gimbal located within the outer gimbal, the inner and outer gimbals having either a common or orthogonal axis of rotation, and wherein the relative position is a relative inertial position,
wherein the first and second position control command instructs the outer gimbal to roll to null yaw of the inner gimbal.

24. An article comprising a storage medium having stored thereon instructions, that when executed by a computing platform, result in:

providing a first position control command to a follow-up system when a relative position between a follow-up system and the controlling system initially exceeds a dead-band value; and providing a second position control command to the follow-up system while the relative position exceeds a null value, the null value being less than the dead-band value, wherein the follow-up system is responsive to the first and second position control commands, the first position control command placing the follow-up system in motion, the second position control command to reduce the relative position, wherein the second position control command is provided after the first position control command and while the follow-up system is still in motion, wherein the first position control command implements the substantially linear function, and the second position control command implements a decaying function, wherein the first position control command implements a substantially linear function increasing from a zero initial value in relation to an amount the dead-band value is exceeded to provide a smooth transition for controlling the follow-up system, the first position control command allowing an increase in the relative position beyond the dead-band value, wherein the substantially linear function is approximately linearly proportional to the amount the dead-band value is exceeded, and wherein the decaying function is initially provided at approximately a current value of the first position control command.

* * * * *